(12) United States Patent
Howorka et al.

(10) Patent No.: US 8,255,317 B2
(45) Date of Patent: *Aug. 28, 2012

(54) VOCALISATION OF TRADING DATA IN TRADING SYSTEMS

(75) Inventors: Edward R. Howorka, Denville, NJ (US); Tracey Riordan, Bernardville, NJ (US)

(73) Assignee: EBS Group Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,602

(22) Filed: Aug. 15, 2011

(65) Prior Publication Data

US 2012/0041864 A1 Feb. 16, 2012

Related U.S. Application Data

(63) Continuation of application No. 10/781,703, filed on Feb. 20, 2004, now Pat. No. 8,024,252.

(60) Provisional application No. 60/448,945, filed on Feb. 21, 2003.

(51) Int. Cl.
   *G06Q 40/00* (2006.01)
(52) U.S. Cl. .......................................................... 705/37
(58) Field of Classification Search ..................... 705/37
   See application file for complete search history.

(56) References Cited

U.S. PATENT DOCUMENTS

| | | | |
|---|---|---|---|
| 5,212,731 A * | 5/1993 | Zimmermann | 704/260 |
| 5,375,055 A | 12/1994 | Togher et al. | |
| 5,806,050 A * | 9/1998 | Shinn et al. | 705/37 |
| 6,018,363 A | 1/2000 | Horii | |
| 6,507,818 B1 | 1/2003 | Fishman et al. | |
| 6,574,600 B1 * | 6/2003 | Fishman et al. | 704/270 |
| 7,447,907 B2 * | 11/2008 | Hart et al. | 713/176 |
| 2002/0076048 A1 * | 6/2002 | Hars | 380/205 |
| 2002/0091623 A1 * | 7/2002 | Daniels | 705/37 |

FOREIGN PATENT DOCUMENTS

| | | |
|---|---|---|
| EP | 0773668 A1 | 5/1997 |
| EP | 0871327 A1 | 10/1998 |
| WO | WO-03032627 A1 | 4/2003 |

OTHER PUBLICATIONS

Rule Enforcement Review of the Commodity Exchange, Inc. Division of the New York Mercantile Exchange, www.cftc.gov/tm/tmcomexrer0799.htm (Feb. 1, 2001).

Morningstar Investing Classroom, Morningstar.com's Interactive Classroom—Course 102—The Stock Changes, http://news.morningstar.com/classroom2/printlesson.asp?docId=2955& CN=COM>2002 Morning Star, section A Floor and Branch order ticket reviews, para. 3.

Webmaster General: Jan. 2001.

* cited by examiner

*Primary Examiner* — Jessica Lemieux
(74) *Attorney, Agent, or Firm* — Dickstein Shapiro LLP

(57) ABSTRACT

A trading system such as an anonymous trading system for trading financial and other instruments can vocalize trading data to trader workstations as well as display it on a screen. Where a trader selects to receive vocal announcements, a trading floor identifier unique to his trading floor is also announced at random intervals.

37 Claims, 4 Drawing Sheets

FIG. 3

VOCALISATION OF TRADING DATA IN TRADING SYSTEMS

CROSS REFERENCE TO RELATED APPLICATIONS

This application is a continuation of U.S. application Ser. No. 10/781,703, filed Feb. 20, 2004, which claims the benefit of U.S. Provisional Application No. 60/448,945, filed Feb. 21, 2003, the entirety of each of which is hereby incorporated by reference.

BACKGROUND OF THE INVENTION

This invention relates to the distribution of financial data. It is particularly concerned with the vocalisation of trading data such as price data as produced, for example, from an electronic trading system.

Electronic trading systems for trading instruments such as financial instruments, commodities and other fungibles are well known. An example of such a system is disclosed in U.S. Pat. No. 5,375,055. In this system, available prices in the market are distributed to trader terminals on the basis of the ability of the traders' trading floor to deal those prices. If the trading floor has not extended sufficient credit to a counter-party institution submitting a quote then that quote will not be displayed to traders on that floor. The system is anonymous in that the identity of parties to a trade is not given up until the trade has been completed.

The system of U.S. Pat. No. 5,375,055 is widely used to trade foreign exchange spot currency (FX Spot). The FX Spot market is very volatile and can move extremely quickly. Traders in major institutions may specialise in a single currency pair. Such as US$:Euro, but many traders will trade several currency pairs simultaneously. This requires the traders to keep track of deals being done by other parties, and the quotes input into the market in each of the currency pairs. This demands extreme concentration on behalf of the trader.

U.S. Pat. No. 5,806,050 assigned to EBS Dealing Resources, Inc., discloses a system in which key market data is vocalised to the trader. As well as seeing prices and done deals displayed on their screens, traders can hear trading information as it occurs. Thus, the price at which a trade has been dealt is announced to the trader over a loudspeaker at their terminal. Rather than announce the whole price including the big figure, that is the most significant digit or digits, the system follows market practice and just announces the pips, which are usually the two least significant digits and are those which are of interest to the traders. A range of other market related information may also be vocalised to the trader.

The system disclosed in U.S. Pat. No. 5,806,050 has met with commercial success as it mimicked the behaviour of voice brokers through whom traders traded before the advent of electronic trading systems. It therefore gave them a degree of comfort with operating in an otherwise unfamiliar environment. It also helped them to keep track of movements across several currency pairs.

The system of U.S. Pat. No. 5,806,050 assigns a different voice to each currency pair, up to a limit of, say, three or four, although there is no limit to the number of voices that can be used. Each voice selected is distinctive in terms of pitch and accent to assist the trader in following the movement in each currency.

An anonymous trading system operating in a very liquid market can perform tens of thousands of deals a day. These traders generate a vast amount of market data which is extremely valuable as it shows banks and other institutions the true position of the markets. This market data is commonly sold to subscribing institutions and customers and is an important source of income from trading system operators. Use of the system described in U.S. Pat. No. 5,806,050 was discontinued when it was found that traders were passing market price data vocalised by the trading system to their clients. Traders would place a telephone handset next to the speaker through which the prices were vocalised. At the other end of the telephone line, the prices would be broadcast over a loudspeaker to the trader's customer. Clearly this resulted in a loss of revenue to the system operator and, as a result, the vocalisation of trading data was discontinued.

It is recognised that the vocalisation of trading data is very useful to traders and it is desirable that it should be continued. However, there exists the problem of how to prevent traders from passing this data to their customers illicitly.

SUMMARY OF THE INVENTION

The invention aims to address this problem and, in its broadest form, resides in the vocalisation of a unique identifier at random intervals. This unique identifier may identify an individual trader or trading floor. It may, for example, be the four letter trading floor code that is universally adopted in the financial trading industry. Preferably, the unique identifier will be vocalised randomly, for example once every half hour on average. Preferably the unique identifier will also be vocalised when the trader first switches on their system.

Embodiments of the invention do not prevent the traders passing on market data to their clients. However, it is no longer attractive to receiving clients to accept that data as they know that the trading floor code from where the data originated will be vocalised in an environment where anyone on the trading floor can hear it. This environment may include third parties or even representatives from the trading system operator and advertise, very publicly, that the data has been obtained illicitly. This is injurious to the reputation of the institution and sufficient to deter them from accepting the market data from rogue traders.

Preferably, the trading system uses an architecture similar to that of U.S. Pat. No. 5,375,055 referred to above, in which an individual market view is prepared for each trading floor in accordance with their credit with other parties trading on the system. As this market view is unique to the trading floor it is relatively simple to insert the deal code for that trading floor into the data stream supplied as the market view.

BRIEF DESCRIPTION OF THE DRAWINGS

Embodiments of the invention will now be described, by way of example only, and with reference to the accompanying drawings, in which:

FIG. 3 depicts a typical trader workstation display;

DETAILED DESCRIPTION OF THE PREFERRED EMBODIMENTS

Figure 1:
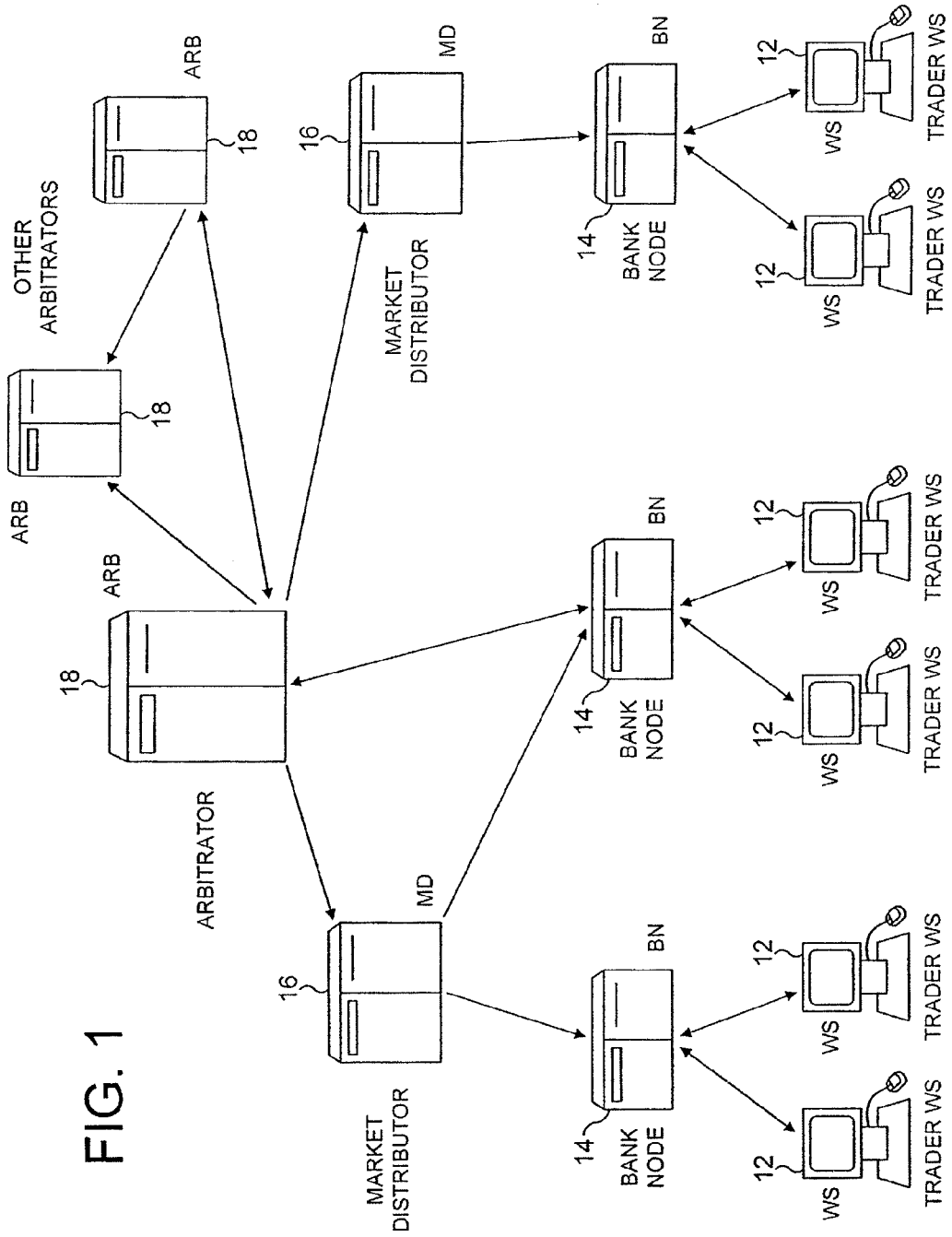
FIG. 1 depicts an electronic trading systems of the trading system of the type disclosed in U.S. Pat. No. 5,375,055.

The manner in which trading data is vocalised and communicated to traders is well known from U.S. Pat. No. 5,806, 050 and will not be described further except as necessary to illustrate the present invention. The content of U.S. Pat. No. 5,806,050 is hereby incorporated by reference. Similarly, a distributed trading system which filters quotes for credit and only displays dealable quotes to traders is well known from U.S. Pat. No. 5,375,055 and will not be described further except as necessary to illustrate the present invention. The content of U.S. Pat. No. 5,375,055 is hereby incorporated by reference. Referring to FIG. 1, a distributed anonymous trading system 10 includes a plurality of trader terminals 12 which typically comprise industry standard workstations. The trader terminals 12 are connected to a bank node 14 at which credit information is stored. This bank node 14 is located at the bank to which a given floor of workstations 12 is attached and receives and communicates data for that trading floor. Once a deal has been proposed, final credit checking takes place at this node. The bank nodes are connected to market distributors 16 at which market views for trading floors are assembled on the basis of a yes/no credit matrix on the basis of which a given quote is only distributed to a trader of the matrix indicates that the trading floor to which it belongs has credit to deal with the counterparty who submitted the quote.

The market distributors 16 are in turn connected to one of a plurality of arbitrators 18. The arbitrators 18 act as the matching engines and are responsible for matching bids and offers and executing deals, subject to the credit restrictions imposed by the bank nodes and the market distributors.

Figure 2:
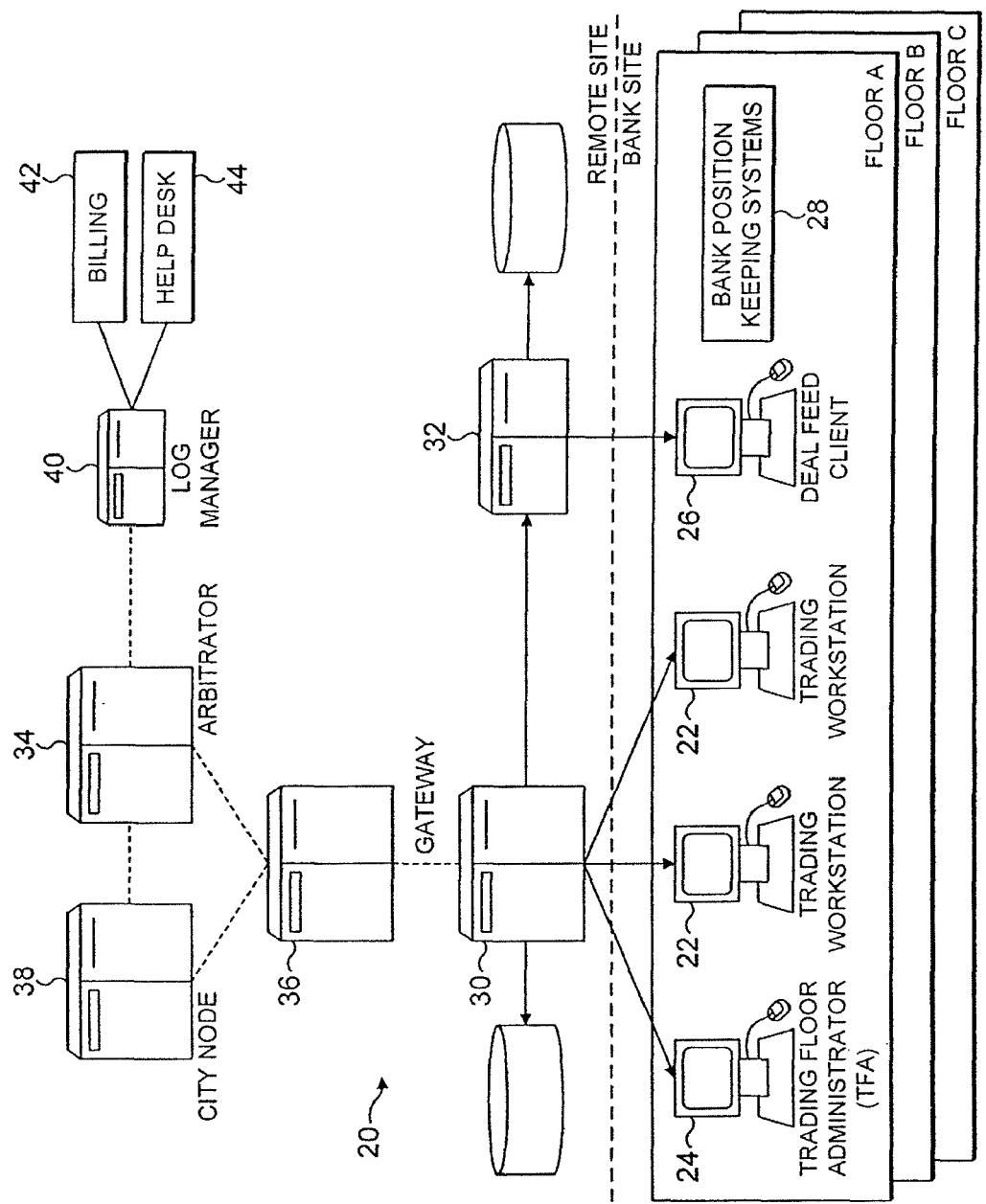
FIG. 2 depicts a variation on the architecture of the system of FIG. 1.

The system of FIG. 2 is similar to that of FIG. 1 except that the market distributors 16 and bank nodes are replaced by broking nodes 30 which perform all the tasks previously performed by the market distributors and the bank nodes. Each trading floor is connected to a single broking node.

Trader workstations 22 are located at each trading floor together with a trading floor administrator 24 which is present, although not shown, in the architecture of FIG. 1. A deal feed client 26 receives details of all deals that involve the trading floor and sends them to bank position keeping system 28, for example for settlement.

The trading workstations and the trading floor administrator communicate directly over a communications network with a broking node 3. The broking node 30 performs the functions of the regional market distributor 16 and local bank nodes in the FIG. 1 architecture. It follows, therefore, that the system includes a plurality of broking nodes 30 although one only is shown. The broking node is responsible for price distribution to the trading workstations, submission of orders and hits, deal status information and notifications. It is further responsible for preparing trading profile information and entitlements, administration of credit limits and settlement instructions.

The broking node 30 communicates completed deal information to a deal feed server 32 which distributes deal information to the deal feel clients 26 at individual trading floors.

The broker communicates with the arbitrators 34, only one of which is shown in FIG. 2, which are the same, and perform the same function, as those of the system of FIG. 1. This communication is via a gateway node 36 and a city node 38. The city node is an additional stage in the architecture of FIG. 1 which, while not shown in that figure, has been implemented by the applicant and groups traffic from a number of trading floors prior to the arbitrator stage. A log manager 40 is connected to the arbitrators and itself communicates with help desk 42 and billing 44 functions.

Figure 3:
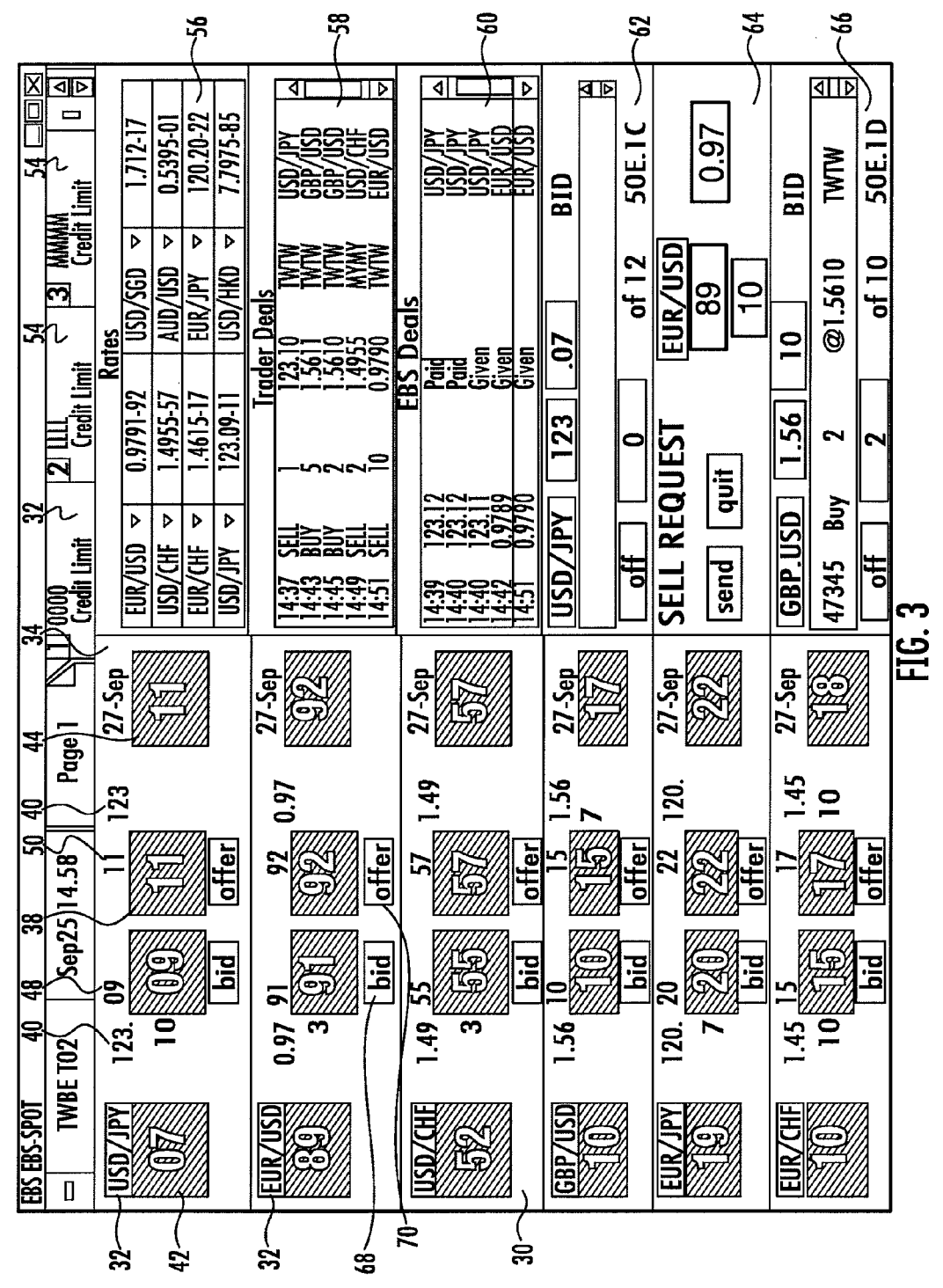

FIG. 3 shows a typical trader display which includes a plurality of price panels 30. These panels indicate the prices in the market for a number of currency pairs. Each panel includes a currency pair identifier 32 at the top left hand side of the panel and the date 34 at the top right hand side of the panel. In the centre of the panel are shown the best bid and offer prices 36, 38 which have been pre-screened for credit and are therefore dealable by the trader. The figures shown are the "pips", that is the least significant digits of the price. The "big figure", that is the most significant digits 40 are shown above and to one side of the pips 36, 38. Thus in the uppermost price panel, which is trading US Dollars and Japanese Yen, the bid rate is 123.09 Yen to one US Dollar and the offer rate is 123.11 Yen. On the far left (bid) and right (offer) hand sides of the panel, also displayed in large format, are displayed the regular prices 42, 44. These are the best prices available at a predetermined amount. In the USD/JPY example, the best offer price 44 is the same as the best credit screened price, whereas the best bid credit screened price is two pips away from the best bid price.

Beside the centre best prices 36, 38 is an indication 46 that the size of a deal available is less than that at the regular price. In the USD/JPY panel, the bid price at 123.09 has a size of 10, indicating that only $10,000,000 is available at that price.

Above the centre best bid and offer prices, displayed in a smaller font size, and preferably in a different colour, are the best prices 48, 50 available on the system. These are prices which may have been entered by parties with whom that particular trading floor does not have credit. Although the trader cannot deal these prices, they enable the trader to assess the quality of the bids and offers that they can trade. In the panels shown in FIG. 3, the credit screened dealable prices are all as good as the best prices in the market regardless of credit.

At the top right hand side of the trader's screen is a series of credit warning panels 52, 54. These alert the trader that a counterparty is approaching or has reached its pre-determined credit limit, and, therefore, that they will not be able to trade with that counterparty unless more credit is allocated. Panel 52 is a warning panel which shows that the limit is approaching. Typically, it is activated when the credit falls to a predefined level, such as 200 of the original allocation and is displayed in a first colour such as yellow. The panels 54 indicate that the credit limits have been reached and are displayed in a second colour such as red. The panels include the four letter counterparty bank code and the words "credit limit".

Below the credit limits is a rates panel 56 which gives the best quoted prices for currency pairs that can be traded on the system. The user may select which currency pairs are to be displayed.

Underneath the rates panel 56 is a trader deals panel 58. This panel shows the deals completed by the trader in the course of the trading day. The time of the deal, the side of the deal, buy or sell, the quantity of the deal, the deal rate, the counterparty and the currency pairs are indicated. Preferably, deals where the trader was the maker are shown in a different colour from deals where the trader was the taker.

Underneath the trader deals panel 58 is a EBS deals panel 60. This panel shows all deals that have been completed on the anonymous trading system. The trader can select whether to display deals in a single currency pair or multiple currency pairs. The panel displays the time of the deal, the rate, whether the price was paid or given and the currency pair.

In the example shown in FIG. 3, the EUR/USD price panel is shown highlighted. Typically, the background to a highlighted panel will be a different colour, for example yellow to the remaining currency pair panels which will typically be white. A highlighted panel is one that has been selected by the trader, for example by positioning a mouse cursor over the panel and clicking, for trading.

By clicking on the bid or offer button 68, 70 on the price panel, an appropriate transaction panel 62, 64, 66 will open up in the area beneath the EBS Deals panel 60. The transaction panels display the details of the transaction which the trader can adjust before submission. The panel also shows the transaction status to enable the trader to track the deal completion process.

Bid panels 62 and 66 are shown for the currency pair USD/JPY and GBP/USD. Panel 64 is a sell request panel, for EUR/USD and enables the trader to select the price and amount he wishes to trade. This panel is activated by selecting the bid or offer button on the highlighted price panel. The panel includes a send button 72 which sends the request to the system and a cancel button 74 which cancels the request.

The voice messages which accompany the trading information provided on the screen fall into three categories: Market Broadcast messages, which are general messages to all system users; Maker and Taker Specific messages, which are sent out to individual traders, and Deals and Price Change messages. It will be appreciated that each currency pair will have a separate set of messages. To enable the trader to distinguish one currency pair from another, each currency pair has its messages vocalised using a voice unique to that pair.

The trader can choose which voice to assign to which pair. In theory, a voice could be assigned to each possible currency pair that a trader could trade. In practice, the system may only support three or four voices. These are most easily distinguished from each other by pitch and accent. For example there may be one male and one female voice vocalising with an American accent and one make and one female voice vocalising with an English accent.

The three message types described above may be played at the same time, in parallel. Due to credit restrictions, broadcast messages are not necessarily identical across trading floors.

As discussed in detail in U.S. Pat. No. 5,806,050 referred to above, the manner in which a currency pair price will depend on the format of that price. The pips digits are vocalised more often that the figures digits as it is the pips digits that change frequently.

The price is vocalised two digits at a time and, where a price has more than two digits, different rules are used to vocalise the two most significant pips digits and the least significant pips digits, known as extra pips.

In general, the rules for vocalising a currency pair are as follows:

1. Discard any leading zeros from the figure;
2. If the figure contains only one digit, say that digit;
3. If the figure contains two digits, then say the figure as a two digit number;
4. If the figure contains three digits, then say the most significant digit by itself and then say the two least significant digits as a two-digit number. If the second digit is a zero then say the last two digits as "oh" followed by the third figure digit. If the second and third digits are both zero then say "double-oh";
5. If the figure contains four digits then discard the most significant digit and say the least significant digits as in rule 4;
6. If the first pip digit is zero then say the word "oh" followed by the second pips digit. If both the pips digits are zero then say "figure";

Extra pips for two and three pip currency pairs are handled as follows:

7. If there are no extra pips say nothing;
8. Say the work "and" between the pips and the extra pips;
9. If the extra pips are equal to 25, 50 or 75 then say "a quarter", "a half" or "three quarters" respectively. If the first extra pip digit is zero then say the word "oh" followed by the second extra pip digit.

Extra pips for four-pip currency pairs are handles as follows:

10. Always say the extra pips, even if they are equal to zero;
11. Do not say the word "and" between the pips and the extra pips;
12. If there is only one extra pips digit then append a trailing zero and say the extra pips as a two digit number. If the first extra pips digit is a zero then say the word "oh" followed by the second extra pips digit. If both of the extra pips digits are zero then say "double-oh".

It will be appreciated that these rules are somewhat arbitrary and are chosen to follow conventions used by market traders.

The broadcast messages that the system vocalises are as follows:

| Situation | Floor Hears |
| --- | --- |
| Regular Quote | <price><price> |
| Bid side small with regular offer | <price><price> small bid |
| Offer side small with regular bid | <price><price>small offer |
| Both sides small | <price><price> in small |
| Bid & Offer identical and regular | <price> choice |
| Bid & Offer same, small bid | <price>choice small bid |
| Bid & Offer same, small offer | <price>choice small offer |
| Bid & Offer same, both small | <price>choice in small |
| Bid only | <price>bid |
| Offer only | <price>offered |
| Small bid only | <price>bid small |
| Small offer only | <price>offered small |

In each of the above <price> means a variable field number representing a price.

Details of the way in which these messages are annunciated are to be found in U.S. Pat. No. 5,806,050.

The maker and taker specific messages are as follows:

Maker Messages

| Situation | Maker Hears |
| --- | --- |
| Your Quote is dealable somewhere | Your{bid/offer/price} |
| Your Quote is bettered | {bid/offered}inside |
| Your Bid is hit | <amount>yours |
| Your offer is taken | <amount>mine |
| Notice that your partially dealt on quote is still alive | Working on |
| System Removes Quote | {bid/offer] cancelled |

Taker Messages

| Situation | Taker Hears |
| --- | --- |
| Situation | You sell <amount> |
| You hit a bid | You buy <amount> |
| You take an offer | Working on |
| Your hit or take completely missed | Missed it |
| Hit or Take Completed, Partially filled | Missed <amount missed> |

The third category of message is system deals and price change reasons. These messages are as follows:

|  | Message Heard |
|---|---|
| System Deals | |
| Regular bid is hit | <price> given |
| Regular offer is taken | <price> paid |
| Price Change Reasons | |
| Regular bid is hit | <price given> |
| Regular offer is taken | <price paid> |
| Bid Removed | Bid out |
| Offer taken | Offer out |
| Bid and Offer removed | Bid and Offer out |

The trader has the opportunity to select which of these three sets of message types he wishes to hear.

It will be appreciated that there is some overlap between the message sets. This will lead to a trader hearing messages in parallel. For example, if an offer is taken at 22, the broadcast message will be "22 paid" and the maker will additionally hear "10 mine" and the taker "you buy 10" for a deal the size of 10 million.

In addition to the deal related voice messages, the system also broadcasts each trading floor's bank code to that trading floor at intervals throughout the trading day. Instead of a bank code, some other identifier for the trading floor or the bank or institution to which they belong may be used. The four letter bank code adopted and used to identify all participants on the system on deals displayed on trader work stations is the presently preferred identifier. Preferably, the bank code is vocalised when a trader logs onto the system. It is then vocalised randomly through the trading day. Preferably the vocalisation should occur twice within each hour averaging once per half hour although other intervals may be used.

The vocalisation of the trading floor or bank identifier may be achieved using a recorded voice or an electronically synthesised voice. Bank codes are all four letter codes, so that only 26 letters have to be recorded or synthesised, "A" to "Z". However, it is desirable and preferred to include a second set of letters to be recorded with an upward intonation for the fourth character. This assists the intelligibility of the bank code.

The code is vocalised as a letter string. For example, as can be seen from the top left hand corner of the display of FIG. 3, the bank code for that trading floor is TWBE. That is vocalised as T-W-B-E, preferably with an upward intonation on the "E".

The purpose of the bank code vocalisation is to act as a security measure to deter traders from broadcasting their voice messages to other banks or customers. Traders have the option of whether or not they receive voice messages or not. However, if they choose to receive voice messages it is preferred that they do not have the option of switching off the vocalised bank or trading floor identifier.

Figure 4:
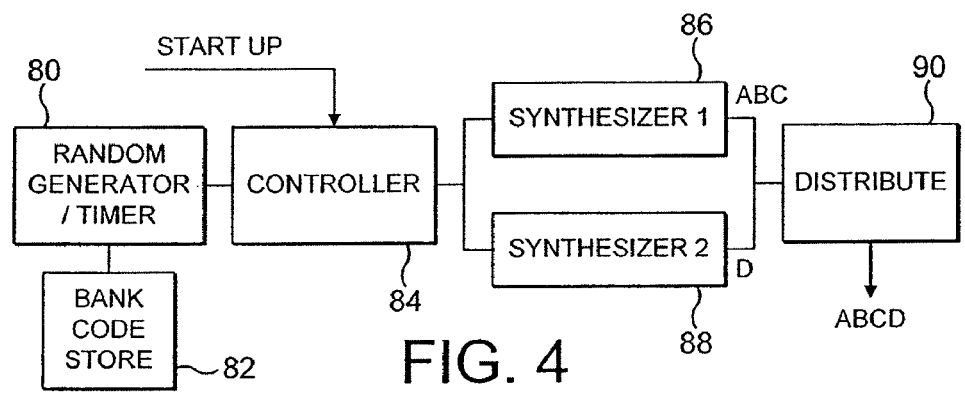
FIG. 4 depicts, schematically, one arrangement for producing unique trading floor identifiers.

The generation of the voice messages may be handled at the trader terminals under the control of the market distributor 16 in the system of FIG. 1 or the broking node 30 of FIG. 2. FIG. 4 illustrates schematically, one possible way in which the random voice bank identifier may be implemented.

A random generator 80 selects a bank code from a bank code store 82 at random, the generator being controlled by a controller 84 such that each trading floor is selected twice within a period of an hour. The controller also receives an indication that a trader has logged onto the system which will prompt it to cause the traders bank code to be generated.

The controller 84 controls, in turn, first and second voice synthesizers 86, 88 in turn the first voice synthesizer synthesizes the first three letters of the four letter code and the second synthesizer synthesizes the fourth letter with an upwards intonation.

Figure 5:
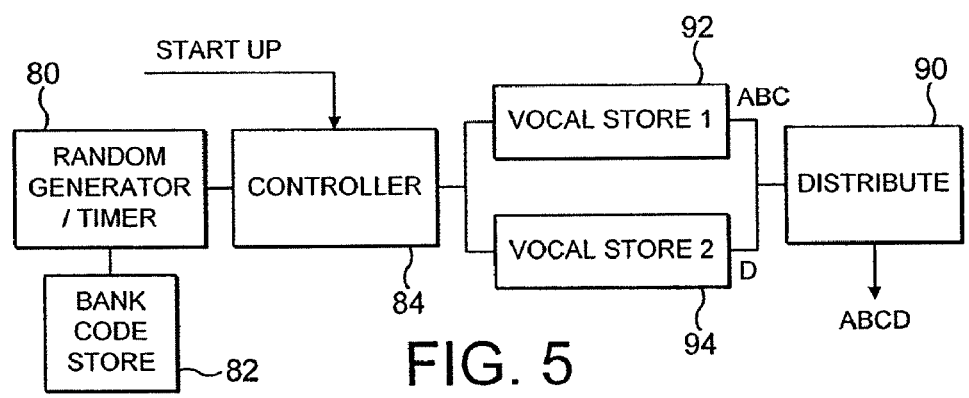
FIG. 5 depicts, schematically, an alternative to the arrangement of FIG. 4.

A distributor 90 distributes the vocalised identifier to the trader floor to which it relates. The synthesizers 86, 88 may be replaced by first and second stored 92, 94 as shown in FIG. 5. The controller controls from which addresses in these stored pre-stored letters forming the voice codes are read out. The first store is addressed three times to read out the first three letters and then the second store is addressed to read out the last letter. One of the synthesizers of FIG. 4 or the stores of FIG. 5 could be omitted if it is decided not to distinguish the fourth letter.

FIGS. 4 and 5 are schematic only. The generation of vocal representation of the floor codes is performed at the trader workstations on instruction from the market distributor or broking node. This is the manner in which the trade related data is annunciated and is described in U.S. Pat. No. 5,806,050. Thus, the speech synthesizers or vocal stores are located at the trader terminals but controlled from the market distributors or broking nodes. This arrangement is preferred although not essential, as it minimises the amount of data to be transmitted across the communications network.

It will be appreciated that the generation of the voice codes could be achieved in many other ways including in software.

Various modifications to the embodiments described are possible and will occur to those skilled in the art. For example, in the description, the announcement of trading data is in addition to a visual representation on the screen. As an alternative, trading data could be presented to traders only as vocal announcements with no visual display. The trading floor codes are still announced in the manner described. The invention is limited only by the following claims.

What is claimed is:

1. A trading system comprising:
a plurality of trading floors each having a plurality of trader workstations, and a distributor for distributing to the trader workstations data related to one or more instruments being traded on the system, at least a portion of the data being audibly announced at the trader workstations, wherein a trading floor identifier unique to each trading floor or unique to the institution or party to which the trading floor belongs is also audibly announced to each trading floor.

2. The trading system according to claim 1, wherein the trading floor identifier is announced at random intervals.

3. The trading system according to claim 2, wherein the trading floor identifier is announced at random intervals with a predetermined number of announcements being made over a given time period.

4. The trading system according to claim 3, wherein two announcements of the trading floor identifier are made each hour.

5. The trading system according to claim 1, wherein the trading floor identifier comprises a four letter trading floor code.

6. The trading system according to claim 5, wherein the intonation of the last letter of the four letter trading floor code is upwards.

7. The trading system according to claim 1, comprising a first voice synthesizer for synthesizing at least a portion of the trading floor identifiers.

8. The trading system according to claim 7, comprising a further voice synthesizer for synthesizing a portion of the trading floor identifier in an intonation different from that of the first voice synthesizer.

9. The trading system according to claim 1, comprising a first voice store for storing a vocalisation of at least a portion of the trading floor identifier.

10. The trading system according to claim 9, comprising a second voice store for storing a vocalisation portion of the trading floor identifier, the stored vocalisation having a different intonation from the vocalisation stored in the first voice store.

11. A computerized method of distributing trading data from a computerized trading system to trading floors comprising a plurality of trader workstations, the method comprising:

the computerized trading system distributing data related to instruments being traded on the system, at least a portion of the data being structured to facilitate audible announcement of the data, and at trader workstations of each trading floor, audible announcement of an identifier unique to the trading floor.

12. The method according to claim 11, wherein the data is structured to facilitate announcement of the trading floor identifier at irregular intervals.

13. The method according to claim 12, wherein the data is structured to facilitate a predetermined number of announcements over a given time period.

14. The method according to claim 13, wherein the data is structured to facilitate two announcements at random twice every hour.

15. The method according to claim 11, wherein the trading floor identifier is announced when a trader workstation on that trading floor logs onto the trading system.

16. The method according to claim 11, wherein the trading floor identifier comprises a four letter code.

17. The method according to claim 16, wherein the intonation of the fourth letter of the trading floor identifier is upwards.

18. The method according to claim 11, wherein the audible trading floor identifier comprises a synthesized voice.

19. The method according to claim 11, wherein the audible trading floor identifier comprises a recorded message.

20. A computerized trading system comprising a distributor for distributing to trader workstations data related to one or more instruments being traded on the system, at least a portion of the data being structured to facilitate audible announcement at the trader workstations of the trading floors, and for distributing an identifier unique to the institution or party to which the trader workstation belongs or unique to each trading floor to which the trader workstation belongs, the identifier facilitating audible announcement of the identifier to each trading floor.

21. The trading system according to claim 20, wherein the data is structured to facilitate the identifier being announced randomly.

22. The trading system according to claim 21, wherein the data is structured to facilitate the identifier being announced randomly with a predetermined number of announcements within a given interval.

23. The trading system according to claim 20, wherein the identifier is a series of characters.

24. The trading system according to claim 23, wherein the final character has an upwards intonation.

25. The trading system according to claim 20, wherein the identifier is synthesized.

26. The trading system according to claim 20, wherein the identifier is a recorded voice.

27. A computerized method of distributing trading data from a computerized trading system to trading floors comprising a plurality of trader workstations, the computerized method comprising:

distributing data, from the computerized trading system, structured to facilitate audible announcement of data relating to instruments being traded on the computerized trading system and audible announcement of an identifier unique to a trading floor, or the institution to which it belongs, at each trading floor.

28. The method according to claim 27, wherein the data is structured to facilitate announcement of the trading floor identifiers at irregular intervals.

29. The method according to claim 28, wherein the data is structured to facilitate a predetermined number of announcements being made over a given time period.

30. The method according to claim 28, wherein the data is structured to facilitate two announcements being made at random times every hour.

31. The method according to claim 27, wherein the trading floor identifier is announced to that trading floor when a trading workstation from that trading floor logs into the trading system.

32. The method according to claim 27, wherein the trading floor identifier comprises a series of characters.

33. The method according to claim 32, wherein the intonation of the final character is different from the intonation of the other characters.

34. The method according to claim 33, wherein the final character has an upwards intonation.

35. The method according to claim 27, wherein the identifier comprises a synthesized voice.

36. The method according to claim 27, wherein the identifier comprises a recorded voice.

37. A trader terminal for a trading system for trading fungibles between traders, the terminal comprising a vocalisation unit for converting selected trading data received from the trading system into audible announcements, the vocalisation unit further audibly announcing an identifier unique to the trading floor, institution or party of which the trader terminal is a part.

* * * * *

UNITED STATES PATENT AND TRADEMARK OFFICE
CERTIFICATE OF CORRECTION

| | | |
|---|---|---|
| PATENT NO. | : 8,255,317 B2 | Page 1 of 1 |
| APPLICATION NO. | : 13/209602 | |
| DATED | : August 28, 2012 | |
| INVENTOR(S) | : Edward R. Howorka et al. | |

It is certified that error appears in the above-identified patent and that said Letters Patent is hereby corrected as shown below:

On the Title Page

Item (75) INVENTORS, after second inventor listed, Tracey Riordan, please delete "Bernardville" and insert -- Bernardsville --, therefor.

Signed and Sealed this
Twenty-seventh Day of November, 2012

David J. Kappos
*Director of the United States Patent and Trademark Office*